Nov. 20, 1934.  J. BALTON  1,981,770
ICE CREAM CONE
Filed April 12, 1929
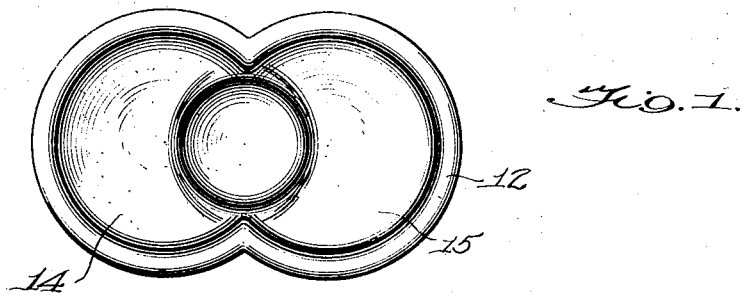
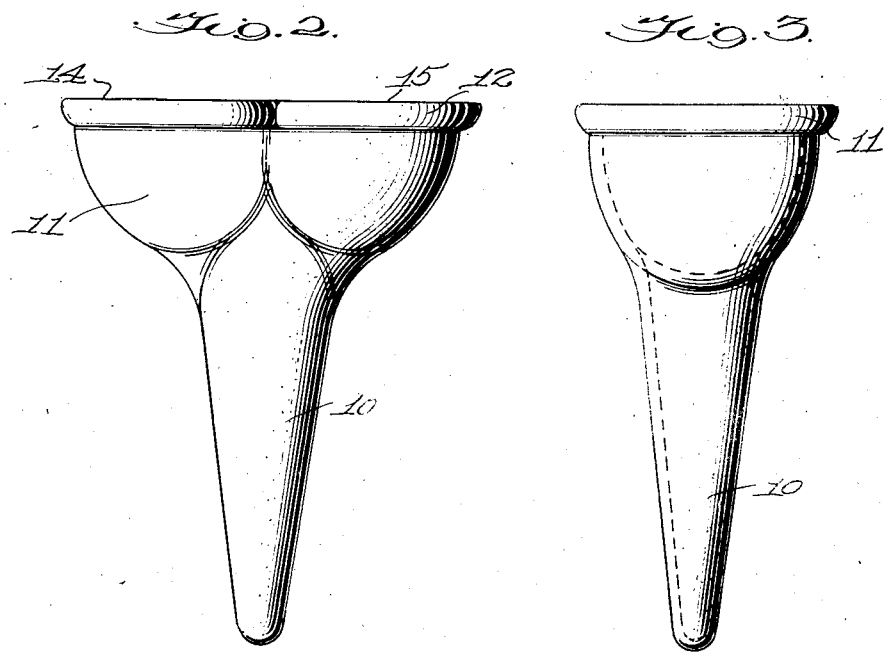

Patented Nov. 20, 1934

1,981,770

UNITED STATES PATENT OFFICE 1,981,770

ICE CREAM CONE

James Balton, Baltimore, Md., assignor to Joseph Shapiro, Baltimore, Md.

Application April 12, 1929, Serial No. 354,678

8 Claims. (Cl. 99—10)

This invention relates to cones which are made of pastry and are used for making ice cream cones, and adapted to be conveniently held in the hand while the ice cream is being eaten.

The invention has for one of its objects to provide a container which may be vended and used in lieu of the popular cone-shaped containers.

One of the main objects of the invention is to provide a cone with the open end having two or more cavities formed therein so that one or more kinds of ice cream or other filler may be vended in the same container or a double order of cream may be served in this container without the necessity of stacking the cream as if a single cone is used. It is understood that the usual design may be employed for decoration and strengthening side walls of the cone.

With the foregoing, and other objects in view, the invention consists of the novel construction, hereinafter more specifically illustrated in the accompanying drawing; but it is to be understood that changes, variations and modifications may be resorted to without departing from the scope of the appended claims.

In describing the invention in detail, reference is had to the accompanying drawing wherein like character of references indicates corresponding parts throughout the several views, in which:

Figure 1 is a top plan view of my improved cone.

Figure 2 is a side view of the same.

Figure 3 is an end view of the invention.

The cone is made of the usual pastry material and in the preferred form shown, consists of a slender conical handle such as 10 integral with a double bowl-like portion 11 which has a strengthening ring or rib 12 around the open end 13. The bowl-like portion 11 has two cavities 14 and 15 formed therein which are adapted to receive two orders of filler or ice cream. The two orders are kept separate and at the same time the popular demand for two kinds of ice cream in the same cone is met. The two cavities 14 and 15 are formed in the outer shell of the and opening but they terminate in the single cavity in the stem 15.

Prior to my present invention ice cream cones were well known and invariably were constructed as a single unit either of true conical form, cup-shaped bowl type or torch shape, the form of the cone varied. Without exception, however, all ice cream cones manufactured before my present invention became known embodied only one opening or pocket for the reception of ice cream.

Frequently a purchaser demanded a double quantity of ice cream per cone and this demand has been met heretofore by placing one gob of ice cream in the cone and a second gob on top of the first gob whereby the first gob is supposed to support or sustain the second gob. This is what is commonly called a "double decker".

The disadvantages of the "double decker" have long been manifest; in the first place the entire weight of the two gobs of ice cream is supported by the mouth of the single circumference hole of the cone and the cone frequently breaks when the second gob is forced down onto the first gob to make it stick; in the second place the top gob frequently falls off with the result that the purchaser loses half of his ice cream, and this is particularly the case where the ice cream is frozen hard; in the third place with the "double decker" cone if the ice cream is soft the upper gob melts and flows down over the lower gob and since the lower gob is close to the mouth of the cone the meltings necessarily run down the side of the cone and mess the hand of the holder.

Further, eating the "double decker" is an awkward thing particularly where two flavors of ice cream are used. The top one must of necessity be eaten first and in eating the top one, especially where the ice cream is frozen hard, the adhesion between the upper and lower gobs is frequently broken and the upper gob messes over the hands and garments of the user. It is not possible to eat the upper and lower gobs alternately. It was to overcome the above objectionable features of the "double decker" cone that I produced my cone.

By the use of my invention all of the above noted objections have been overcome and it is now possible satisfactorily to sell a two-gob sale of ice cream (different flavors are frequently demanded) in such a manner that the gobs are located side by side yet are connected together at one place of contact, making it impossible to lose the contents of the cone and enabling the separate flavors to be eaten separately as and when desired, and providing for the collection of the drip in the stem of the cone as well as preventing the slopping of the ice cream over the outside of the cone.

According to my invention the cone is so constructed as to present a plurality of contiguous but definitely independent bowls open at the top but merging with one another and with a common hollow stem, the stem constituting a handle and also serving as a common collection pocket or reservoir for melted cream which drains from the bowls.

My construction enables the user to start with ice cream of two different flavors, say chocolate and strawberry for example, separately in the bowls, and finish with a liquid in the stem of a flavor which is a combination of the two, i. e., a combination of chocolate and strawberry in the example given.

Further, by having a common stem for the bowls it is possible to make the article in the larger sizes (ten cent, fifteen cent, twenty cent gobs of ice cream) without unduly enlarging the stem so that it becomes difficult to grasp, especially by children.

From the foregoing description taken in connection with the accompanying drawing, it is thought the construction, uses and advantages of the invention will be clear to those skilled in the art.

What I claim is:

1. As a new article of manufacture, an ice cream cone formed as an integral structure composed of edible material and comprising a handle portion, an elongated receptacle portion mounted upon said handle portion, said receptacle portion being open at its top and having its intermediate portion constricted transversely to form a plurality of communicating chambers, said handle portion comprising a conical hollow stem, the interior of which is in communication with each of said communicating chambers.

2. An ice cream cone of edible material having its upper end formed with twin pockets, each adapted to receive and retain a scoop of ice cream with the cream in each pocket disposed side by side and in the same general horizontal plane, said twin pockets communicating with one another.

3. As a new article of manufacture, an ice cream cone formed as an integral structure and comprising a hollow handle and an elongated receptacle disposed at right angles to the axis of said handle and having its intermediate portion constricted thereby to form a plurality of communicating compartments to severally receive individual masses of ice cream.

4. As a new article of manufacture, an ice cream cone formed as an integral structure composed of edible material and comprising a handle portion, an elongated receptacle portion mounted upon said handle portion, said receptacle portion being open at its top and having its intermediate portion constricted transversely to form a plurality of communicating chambers.

5. As a new article of manufacture, an ice cream cone formed as an integral structure and comprising a hollow handle portion and an elongated receptacle portion at the upper end of said handle portion and at right angles thereto, said receptacle portion being constricted transversely of its ends, thereby to form a plurality of compartments communicating with each other and with the interior of the handle portion.

6. An ice cream cone of edible material having its upper end formed with a plurality of pockets each adapted to receive and retain a scoop of ice cream with the cream in each pocket disposed side by side in the same general plane, said pockets communicating with one another.

7. An ice cream cone of edible material having a stem portion provided with a cavity and having its upper end formed with a plurality of ice cream receiving bowl members radiating from the axis of the stem, each bowl member adapted to receive and retain a scoop of ice cream, said bowl members communicating with one another and with the stem whereby in virtue of the aforesaid construction the meltings of ice cream from all bowl members may flow into the cavity of the stem, the bowl members being so located with respect to one another and to the stem that the ice cream in all bowl members will be accessible at the same time.

8. An ice cream cone of edible material having its upper end formed with a plurality of pockets each adapted to receive and retain a scoop of ice cream, said pockets communicating with one another and with the stem whereby the meltings from ice cream from all pockets may flow into the cavity of the stem, the pockets being so located with respect to one another and to the stem that the ice cream in all pockets will be accessible at the same time.

JAMES BALTON.